US005447111A

United States Patent [19]
Ning

[11] Patent Number: 5,447,111
[45] Date of Patent: Sep. 5, 1995

[54] ROTOR TYPE ENERGY SAVING APPARATUS MOUNTED ON THE BOW

[76] Inventor: Jianjin Ning, Room 202, No. 252 Cao Yang Er Cun, Shanghai, 200062, China

[21] Appl. No.: 282,618

[22] Filed: Jul. 29, 1994

[30] Foreign Application Priority Data

Jul. 29, 1993 [CN] China ............................. 93226089.6

[51] Int. Cl.6 .............................................. B63B 1/34
[52] U.S. Cl. .................................................. 114/67 R
[58] Field of Search ..................... 440/48; 114/343, 56, 114/57, 67 R

[56] References Cited

U.S. PATENT DOCUMENTS

| 39,067 | 6/1863 | Reigart | 114/67 R |
|---|---|---|---|
| 417,888 | 12/1889 | Stevenson | 114/67 R |
| 1,140,786 | 5/1915 | Wright | |
| 1,458,600 | 6/1923 | Taber | |
| 1,763,415 | 6/1930 | Boyce | 440/48 |
| 1,824,667 | 9/1931 | Grumpelt | 440/48 |
| 1,853,890 | 4/1932 | Augner | |
| 2,755,867 | 7/1956 | Hoke | |
| 3,041,992 | 7/1962 | Lee | 114/67 R |
| 3,082,732 | 3/1963 | Stallman | 440/48 |

FOREIGN PATENT DOCUMENTS 17787 of 1900 United Kingdom .................. 440/48

Primary Examiner—Stephen Avila
Attorney, Agent, or Firm—Abelman, Frayne & Schwab

[57] ABSTRACT

A rotor type energy saving apparatus mounted on the bow of a ship is disclosed for reducing the water resistance against the bow of a ship and converting the linear movement of waves into rotational movement to obtain an impelling force. Application of the apparatus results in a decrease in the amount of energy required to propel the ship. The apparatus has a conical shaped outer shell with blades running along its length and an inner means allowing the device to freely rotate. The apparatus is useful in reducing resistance and providing an impelling force on a variety of ships. It is best suited for use on small ships which have lengths under 45 meters.

8 Claims, 1 Drawing Sheet

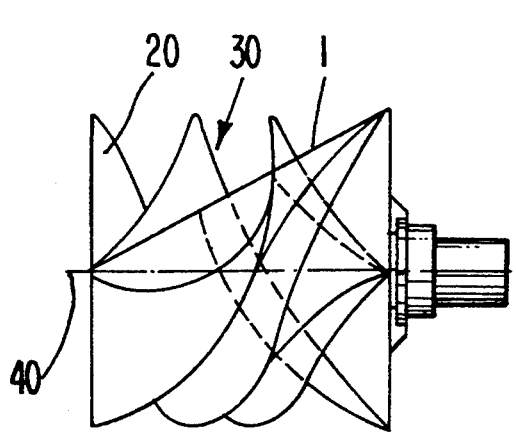
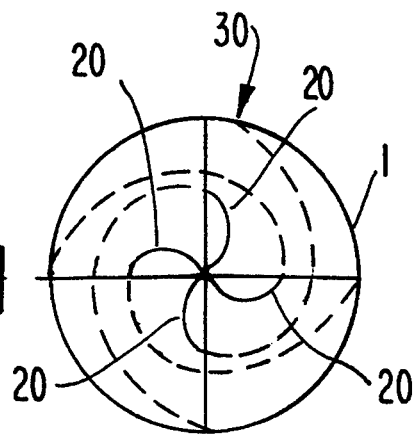
FIG. 1              FIG. 2
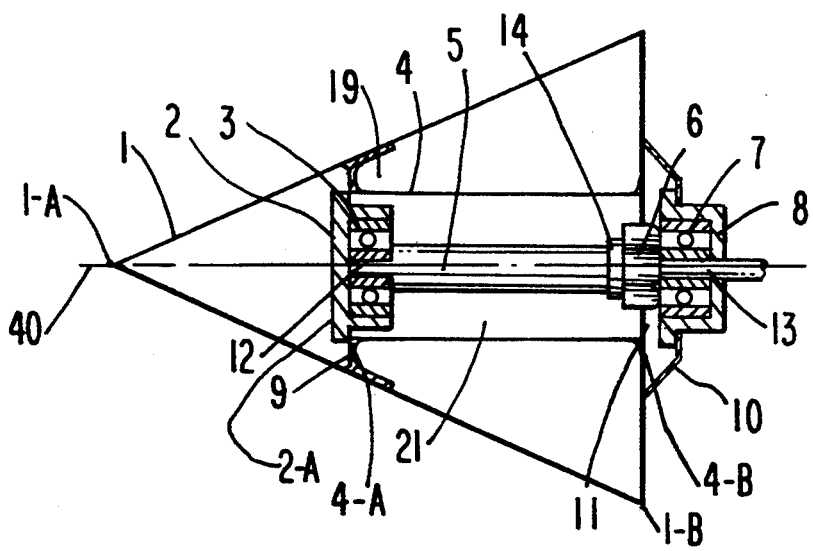
FIG. 3
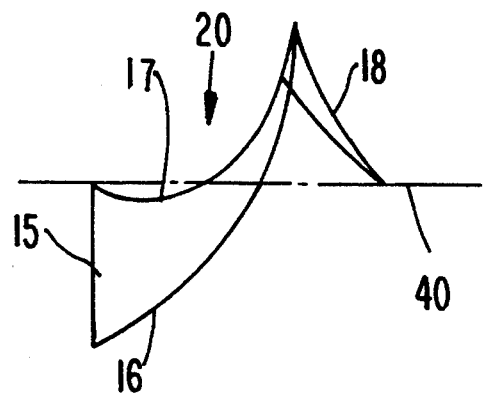
FIG. 4

ROTOR TYPE ENERGY SAVING APPARATUS MOUNTED ON THE BOW

FIELD OF THE INVENTION

The present invention relates to the conservation of energy in the propulsion of ships. Particularly the invention relates to energy saving apparatus mounted at the bow of a ship.

BACKGROUND OF THE INVENTION

Various energy saving devices, developed according to the principles of fluid and ship dynamics and mounted at the stern of a ship, are currently known. One such device improves a ship's impelling force by making use of the rotational flow energy provided by a ship's propeller. A guiding wheel is coaxially mounted behind a ship's propeller. This guiding wheel has blades arranged in an outer circle and an inner circle. The blades of the inner circle are a set of hydraulic turbine blades which are located just within the range of the rotational energy of the propeller. The blades of the outer circle are propeller blades beyond the range of the rotational energy of the propeller. When the propeller of the ship rotates, the rotational flow energy produced by the propeller impacts on the hydraulic turbine blades of the inner circle, making the whole guiding wheel rotate at a low speed. At the same time, the propeller blades of the outer circle rotate and produce an additional impelling force which results in an increase in the speed of the ship.

Another type of energy saving device mounted at the stern is a compensating guide pipe. The pipe device guides the incoming flow for the ship's propeller. The guide pipe consists of two right and left half rings with the longitudinal profile of an aerofoil. The guide pipe is mounted in front of a stern-mounted propeller and slightly above the propeller. When the fast water mass points coming out of the half rings pass through the upper portion of the propeller, they accelerate the low speed incoming flow already there. Meanwhile, the low speed water mass points passing the outer surface of the half rings will decelerate the high speed incoming flow at a distance from the surface of a ship body. This improves the inhomogeneity of the incoming flow states of the propeller and the impelling efficiency of the ship.

A bow-mounted energy saving device is also known. It is a bulb-nosed structure which aims at decreasing the curvature change of a ship's bow. This device is designed to lower the viscous pressure resistance. At the same time, this device produces waves which have phase opposite and amplitude equal to the waves at the bow of the ship. The superposition of these device-produced waves results in the decrease or elimination of the resistance of making waves at the outside of the bow. This improves the ship's speed. However, this kind of bulb-nosed structure has only a limited energy saving effect, since the effect of decreasing the resistance and energy consumption depends upon the design of the curvature change of the spherical body of the device. Also, the formation of a spherical body at the bow creates difficulties in ship building.

Known devices, used individually or in combination, lower the total water resistance against a ship by about 18%. The present invention lowers the total water resistance against a ship by approximately 30%.

SUMMARY OF THE INVENTION

The object of the present invention is to provide a stem or bow mounted energy saving apparatus for ships. The apparatus of the present invention turns linear movement of water flow moving toward the bow into rotational movement to obtain impelling force. At the same time, it turns away the impact of a large part of the incoming flow on the bow of the ship. The resistance to the advancement of the ship is decreased by the apparatus. This results in a decrease in the amount of energy required to propel the ship.

The rotor type energy saving apparatus of the present invention includes a cone shaped (conic) outer shell, on the bottom of which is defined an opening. Within the outer shell is a cylindrical inner shell which has a closed and an open end. A front bearing sleeve is disposed on the closed end and fixed on the inner conic surface of the outer shell. The inner shell extends along the center axis of the conic shell to the bottom of the conic shell. The inner shell meets with the opening at the bottom of the conic shell to form a closed cavity in between the two shells and an open cavity within the inner shell.

An inner support means, which is coaxially opposite the bottom of the conic shell, supports the inner shell. The inner support means is mounted to the inner conic surface of the outer shell and has a hole located about the center axis of the conic shell. A front bearing is located within the hole of the inner support means.

An outer support means is mounted at the bottom of the outer shell. The outer support means also has a hole located about the center axis of the conic shell. A rear bearing sleeve is slidably located within the hole of the outer support means.

A shaft with front and rear neck ends is provided along the center axis of the conic shell. The front neck ends is located in the front bearing sleeve. The rear neck end passes through and beyond the rear bearing sleeve. A fixing nut is screwed on to threading on the shaft. The fixing nut abuts an inner edge of the rear bearing sleeve to fixedly position the shaft between the two bearing sleeves.

Several blades are mounted on the conic outer shell. The blades helically extend from the top to the bottom end of the outer conic shell. Each blade is located an equal angle away from each blade directly adjacent to it.

The rotor type energy saving apparatus has an air-filled, water-tight, closed cavity in the conic outer shell. When the rotor apparatus is mounted at the bow of a ship, the water flowing towards the bow can make the rotor rotate. The linear movement of the incoming flow is turned into rotational movement by the apparatus and an impelling force may be obtained from the apparatus. Furthermore, because the rotor apparatus can keep most of the impact of the incoming flow off of the bow. A reduction in the resistance to the advancement of the ship results. In addition, the rotor apparatus can greatly change the wave peak of oncoming waves which cause resistance. The apparatus can also change the shift of the water mass flow line boundary layer, causing the distribution of pressure at the front and back of the ship to be unsymmetric. This results is a total force which is not equal to zero, aiding in the advancement of the ship.

The advantages of the rotor apparatus can be shown both theoretically by flow and ship dynamics and by tests of models of the ships using the apparatus.

Theoretical analysis is first made according to the principles of flow dynamics. The velocity of the water flow impacting on the bow remains unchanged when it is at the periphery of the rotor apparatus. However, when water enters into the apparatus and meets the front part of the blades, the water will push the blades which stand up to the impact of the water, but in the opposite direction. The water will flow along the direction of the reaction force with a certain velocity, just slightly off the central line. The conic outer shell is just designed to adapt to this flow direction.

Using a Chinese civil ship as an example, the speed of a civil ship is generally 12–13 knots (one knot equals 1.852 Km/hour). According to the momentum equation, 912 horsepower-hours are needed for a 100-ton-class ship is to reach a speed of 13 knots in a resistance-free environment. In reality, due to friction resistance ($R_f$), wave making resistance ($R_w$), and viscous pressure resistance ($R_{pv}$), 1200 HP-hours are needed for such a ship to reach 13 knots. According to the Frande Equation, at 13 knots friction resistance ($R_f$) accounts for 40–50%, wave making resistance ($R_w$) accounts for about 50%, and viscous pressure resistance ($R_{pv}$) accounts for about 5% of total resistance ($R_t$).

In testing a model ship (1/20 scale Model 807 Chinese fishing boat), both with and without the rotor apparatus attached to it, under the condition that the model is fixed while water flow impacts it, the following data was obtained:

1. Minimum total resistance ($R_t$) decreased 26.66% when the rotor apparatus was attached to the bow of the ship;
2. Maximum total resistance ($R_t$) decreased 33.3% when the rotor apparatus was attached to the bow of the ship;
3. Overall total resistance ($R_t$) decreased approximately 30% when the rotor apparatus was attached to the bow of the ship;

The energy saving capacity of the apparatus is quite prominent.

The energy saving effect of the present invention can also be seen from an energy analysis. Without the application of the present invention, all the mass points of water continuously impacting on the bow of a ship flow by the ship's side a certain distance and the ship will advance a certain distance in the opposite direction. The impact force of the water and the impelling force of the ship are equal to and in opposite directions of each other.

The absolute impelling force of the ship (K) multiplied by the respective distance results in the respective energy. If the ship is considered a point on the Cartesian coordinate system, the above-mentioned two distances are additive and the sum of the two energies should be total energy (Y), such that the function relationship $Y = K * f(X)$, wherein X is the absolute distance of the flow on the Cartesian coordinate system (the quantity and density of the water are considered in the impact force of the water). The rotor apparatus has an impelling force K', where K' < K. The rotor apparatus at the same time keeps the impact of the incoming water off the bow of the ship. If the ship is propelled with the active power of total energy Y, the ship can go a longer distance X', where X' = X+ X, X > 0, X' > X, X is the change in distance, amd X' is the total of the original distance travelled plus the additional distance brought about by the rotor apparatus.

Correspondingly, $Y' = K * f(X')$, where Y' is the total energy with the rotor apparatus mounted on the bow of the ship. If Y+ =Y, it is apparent that power can be saved because impelling force required to travel distance X is less with the apparatus K' than impelling force required without the apparatus K.

The rotational speed of the rotor varies with the magnitude of the impact force of the incoming water flow in front of the ship. Testing has shown that the larger the impact force of the incoming flow, the higher the rotational speed of the rotor will be and the stronger the impelling force will be. This will compensate for the unfavorable influence caused by the large impact force of the water on the advancement of the ship. Due to this compensation, the ship, when sailing against the current with the rotor apparatus mounted on the bow, will advance much as it would in calm water.

The rotor apparatus is useful in reducing resistance and providing an impelling force on a variety of ships. It is best suited for use on small ships which have lengths under 45 meters.

BRIEF DESCRIPTION OF THE DRAWINGS

FIG. 1 is the side schematic view of the preferred embodiment of bow mounted rotor type energy saving apparatus with propeller blades shown.

FIG. 2 is a front schematic view of the preferred embodiment.

FIG. 3 is a longitudinally sectioned view of the preferred embodiment with propeller blades not shown.

FIG. 4 is a side schematic view of a blade of the preferred embodiment.

DESCRIPTION OF THE PREFERRED EMBODIMENT

As shown in FIGS. 1–3, the rotor type energy saving apparatus of the invention 30 includes a hollow, conic outer shell 1 extending along a longitudinal axis 40. Central opening 11 is circular in configuration. Central opening 11 is located on proximal end 1-B of outer shell 1, the center of central opening 11 being located along longitudinal axis 40.

Cylindrical inner shell 4 is tubular in configuration and has a closed, distal end 4-A and an open, proximal end 4-B. Inner shell 4 is of a diameter substantially similar to that of central opening 11. Inner shell 4 extends along the longitudinal axis to the central opening 11. The hollow area within inner shell 4 is open cavity 21. The area outside inner shell 4 and within outer shell 1 is closed internal cavity 19. The perimeter of open, proximal end 4-B is welded to the perimeter of central opening 11.

Distal end 4-A of inner shell 4 is closed by front bearing sleeve 2. Front bearing sleeve 2 is hollow and circular in configuration, with a closed distal end 2-A. 15 Inner support member 9 is circular in configuration. Inner support member 9 has a 16 hollow circular cavity of a diameter which corresponds to the diameter of front bearing sleeve 2 such that the two may have a snug engagement. Inner support 18 member 9 is welded to the inner surface of outer shell 1. Front bearing sleeve 2 extends through the hollow cavity of inner support member 9 and is welded thereto.

Outer support member 10 is circular in configuration. Outer support member 10 is located around central opening 11, the center of support member 10 being located along longitudinal axis 40. Outer support member 10 is mounted on proximal end 4-B of outer shell 1.

Rear bearing sleeve 8 is circular in configuration. Outer support member 10 has a hollow circular cavity of a diameter which corresponds to the diameter of rear bearing sleeve 8 such that rear bearing sleeve 8 is slidably mounted within the circular cavity of outer support member 10.

Shaft 5 has distal end shaft neck 12 and a proximal end shaft neck 13. Shaft necks 12 and 13 are both of a diameter less than that of shaft 5. Front bearing 3 and rear bearing 7 are both hollow and circular in configuration. Front bearing 3 is located around distal shaft neck 12. Rear bearing 7 is located around proximal shaft neck 13. Front bearing 3 is located within front bearing sleeve 2. Rear bearing 7 is located within rear bearing sleeve 8. Proximal shaft neck 13 extends beyond rear bearing 7 and rear bearing sleeve 8. Proximal shaft neck 13 may be connected to the bow of a ship through a transition means (not shown).

Proximal shaft neck 13 contains threaded section 14 along its perimeter. Threaded section 14 adjoins proximal end shaft neck 13 and passes through rear bearing sleeve 8. A fixing nut 6 is threaded onto threaded section 14. Nut 6 is tightened against an inner edge of rear bearing 7 such that shaft 5 is fixedly 13. positioned between the front bearing sleeve 2 and rear bearing sleeve 8.

As shown in FIG. 4, blade 20 consists of a distal end 15, an outer edge 16, an inner edge 17 and proximal end 18. Four propeller blades 20 are mounted along inner edges 17 to the outer surface of outer conic shell 1. Each blade 20 is spaced 90 degrees apart from each other. Each blade 20 helically extends from distal end 1-A to proximal end 1-B of outer shell 1.

Each distal blade end 15 is located in a plane which is perpendicular to longitudinal axis 40 and passes through distal end 1-A of outer shell 1. Each distal blade end 15 has a radius from longitudinal axis 40 to outer edge 16 which is equal to the radius of proximal end 1-B of outer shell 1. Each inner edge 17 is defined along the surface of outer conic shell 1 and is configured in the shape of a spiral of Archimedes. Each outer edge 16 is configured in the shape a cylindrical helix.

The design parameters of the preferred embodiment, in relation to a ship apparatus 30 is to be mounted on, are as follows:
  proximal end 1-B of outer conic shell 1 is 0.57 times a width of the ship;
  outer conic shell 1 has a length 0.70 times the diameter of proximal end 1-B of outer conic shell 1; and
  each blade 20 has a wrap angle of 270 degrees around longitudinal axis 40 of the outer conic shell 1.

When rotor apparatus 30 is mounted on the bow of a ship, longitudinal axis 40 is aligned with the bow of the ship, and the outer circle (periphery) formed by the rotation of the blades is flush with the keel line of the ship.

Outer shell 1 and inner shell 4 are made of sheet metal. Sealed inner cavity 19 is water-tight. Outer shell 1 can rotate freely with the impact of water, thus the reactive force with respect to the impact of the water is not as hard as the collision of the water on the sides of the ship. Propeller blades 20 are welded on outer shell 1. These blades act as stiffening ribs on the outer shell and improve the strength of the rotor. Further, as apparatus 30 is constructed out of sheet metal, only simple, metal working and welding is need to construct the device.

The apparatus 30 is connected to the bow of a ship through proximal shaft end 13 and a transition connecting means. Installation can be accomplished with little retrofitting of existing ships. Thus, the scope of applications for this device is widespread.

It should be noted that use of various other materials, various modifications in the configuration, and the other similar modifications and variations to which the invention is susceptible, may be practiced without departing from the scope, intent, and teaching of the claims.

I claim:

1. A rotary energy saving apparatus adapted to be mounted at the bow of a ship, comprising:
   A. a cone shaped outer shell, with distal and proximal ends and inner and Outer conic surfaces, having a central opening at the proximal end, the outer shell extending along a longitudinal axis;
   B. a cylindrical inner shell, located within the inner conic surface, having a closed end and an open end, the inner shell extending along the longitudinal axis and communicating with the ental opening of the outer shell extending along the longitudinal axis and communicating with the central opening of the outer shell;
   C. a front bearing sleeve provided on the closed end of the inner shell and mounted on the inner conic surface of the outer conic shell;
   D. a support means, having a central hole located along the longitudinal axis, the support means completely surrounding the central opening of the outer shell, and being fixedly attached to the distal end of the outer shell;
   E. a rear bearing sleeve, slidably mounted in the central hole of the support means;
   F. a shaft, having front and rear shaft necks;
   G. a front bearing, located on the front shaft neck and placed within the front bearing sleeve;
   H. a rear bearing, located on the rear shaft neck and the rear shaft neck passing through and extending beyond the rear bearing sleeve;
   I. a plurality of blades extending from said outer shell, each having an inner and outer edge, each blade having a starting point at a distal end of the outer shell, each blade being fixedly attached along its inner edge to said outer conic surface, and each blade being located an equal angle away from each blade directly adjacent to it; and
   F. said blades being shaped such that linear flow of water against the blade surfaces causes rotation of said blades and outer shell.

2. The rotary energy saving apparatus of claim 1 wherein the central opening of the outer conic shell and the open end of the inner shell are circular in configuration.

3. The rotary energy saving apparatus of claim 1 wherein said plurality of blades constitute four blades fixedly attached to said outer shell.

4. The rotory energy saving apparatus of claim 1 wherein each blade has a front and rear end,
   the inner edge of each blade being configured as a stereo spiral of Archimedes and the outer edge of each blade being configured as a cylindrical helix,
   the front end of each blade being located in a plane, the plane being perpendicular to the longitudinal axis of the outer conic shell and passing through the distal end of the outer shell, and
   the rear end of each blade extending to the proximal end of the outer conic shell.

5. The rotary energy saving apparatus of claim 1 wherein the proximal end of the outer conic shell is 0.57 times a width of a ship the apparatus is to be mounted on.

6. The rotary energy saving apparatus of claim 1 wherein the outer conic shell has a length 0.70 times a diameter of the proximal end of the outer conic shell.

7. The rotary energy saving apparatus of claim 1, wherein each blade has a wrap angle of 270 degrees around the longitudinal axis of the outer conic shell.

8. The rotary energy savings apparatus of claim 1, wherein said blades are shaped to convert the linear flow of water against the blade surfaces to rotational movement.

* * * * *